Dec. 29, 1959 M. E. PARADISE 2,919,299

HIGH VOLTAGE PHOTOELECTRIC CONVERTER OR THE LIKE

Filed Sept. 4, 1957

MAURICE E. PARADISE
INVENTOR.

BY Bruce [signature]

HIS ATTORNEY 2,919,299

HIGH VOLTAGE PHOTOELECTRIC CONVERTER OR THE LIKE

Maurice E. Paradise, Highland Park, Ill., assignor to Hoffman Electronics Corporation, a corporation of California Application September 4, 1957, Serial No. 681,958

8 Claims. (Cl. 136—89)

Figure 1:
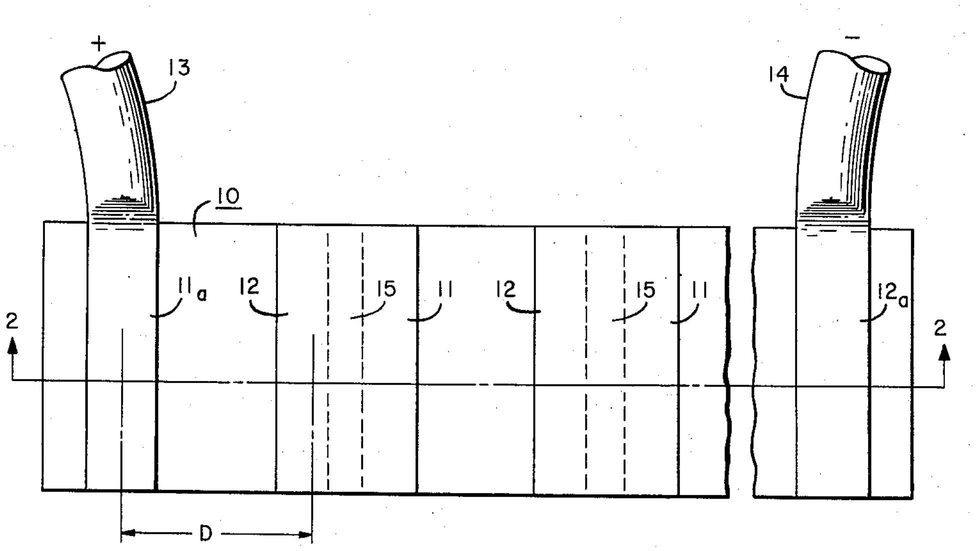

This invention relates to improvements in photoelectric converters and, more particularly, to such a converter which will produce a relatively high voltage when light is incident upon its active surfaces.

When working with photoelectric converters, particularly those of the silicon variety, many applications have been found in which the inherent voltage of each converter element is insufficient to operate associated apparatus such as a storage battery. Therefore, it has been the practice to connect a plurality of converter elements in series, utilizing connections external to the converters in order to derive an adequate voltage to perform the desired function. If one of the converters in the series has characteristics such as internal resistance and current generating capacity which are different from those of the other converters in the series undesirable results such as limitation of the current of the over-all system to the maximum attainable by the least efficient converter occur. Such variations are quite common because of the very complex and delicate processes involved in producing the semiconductor materials which make up the various converter elements. There of course is the additional disadvantage of having to expend the labor necessary to solder interconnecting wires from one converter to the next to effect the series connection.

Therefore, it is an object of this invention to provide a photoelectric converter which inherently generates a relatively high voltage upon impingement of light on its active surface or surfaces.

It is a further object of this invention to provide a photoelectric converter capable of generating relatively high voltages and providing at its output terminals the maximum current available from any portion of it.

It is a still further object of this invention to provide a photoelectric converter which is bidirectional in its principal sensitivity.

According to the present invention photoelectric converting junctions are provided by alloying a plurality of spaced wires or strips of aluminum or other electron acceptor material entirely through the thickness of the base semiconductor material which may be N-type silicon. A wire or strip of material having the same electron donor or acceptor characteristics as the base material is positioned contiguously with all the wires or strips of electron acceptor material, save one, prior to the alloying process and alloys into the base material to form an ohmic contact to the base material in the region where one of the P–N junctions would normally appear. There results a plurality of series-aiding connected photoelectric converting P–N junctions.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which, Figure 1 is an enlarged plan view of a photoelectric converter according to this invention.

Figure 2:
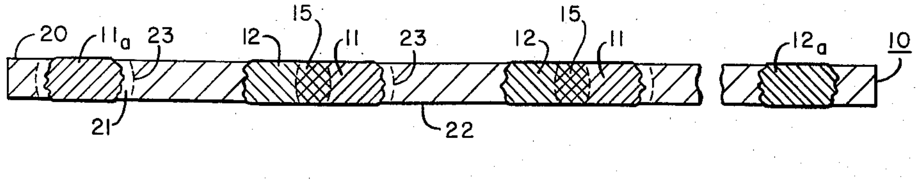

Figure 2 is a cross-sectional view taken along line 2—2 in Figure 1.

In Figure 1 base 10 is a slice or slab of semiconductor material of a first type. To simplify the discussion of this invention and purely by way of example base 10 may be a slice of N-type silicon. Regions 11 and 11*a* represent those areas into which strips or wires of material have been fused or alloyed to produce semiconductor regions of an opposite type to that exhibited by base 10. In my example, therefore, regions 11 and 11*a* may be formed by alloying aluminum wires or strips into base 10 to produce regions of P-type silicon as is described more fully in connection with Figure 2.

Regions 12 and 12*a* in Figure 1 represent those portions of base 10 into which metal wires or strips have been alloyed to provide ohmic connections to base material 10. Hence, the alloying material in regions 12 and 12*a* must have the characteristic of producing silicon regions of the same semiconductor type as base material 10. For the purposes of our example the metal or wire alloyed into regions 12 and 12*a* may comprise antimony-doped gold.

The process of alloying acceptor or donor metals into a semiconductor base is well known and will not be dwelt upon here. Purely by way of example, the regions 11 and 11*a* may be formed by the use of aluminum wire .020 inch in diameter where base 10 is .015 inch thick. Regions 12 and 12*a* may be formed by alloying antimony-doped gold wire of diameter approximating .020 inch into the base 10. The distance D between the center of an aluminum wire and the next successive spaced gold wire may be .050 inch, for example. Except for the first region 11*a* and the last region 12*a* on base 10, the regions include the results of alloying a pair of wires, in our example one being aluminum and the other being antimony-doped gold, into base 10 so that the alloys overlap as suggested by regions 15 in Figure 2.

As can be seen from Figure 2 wires or strips forming regions 11 and 11*a* are alloyed through base 10 from upper surface 20 to lower surface 22 and as a result of such alloying process the crystal regrowth layers 21 of P-type silicon appear resulting in the formation of P–N junctions 23 at each interface between the P regions and the N-type base material 10.

In the process of forming regions 11 and 12 which are seen in Figure 2 to overlap and continuing with the example which has already been cited, an aluminum wire and an antimony-doped gold wire are placed contiguous to each other and across the width of base material 10. The base 10 is then heated to approximately 800° C. and the alloying process takes place. The gold wire as it alloys into the silicon has a sufficiently high N-characteristic so as to overcome the P-characteristics of the aluminum in the regions where the alloys overlap. This effectively short-circuits or, more properly, eliminates one of the two P–N junctions which would be formed if the aluminum wire were alloyed into the silicon by itself. Looking at the over-all converter from a series connected standpoint, it is necessary that one of the two P–N junctions formed by alloying the aluminum wire into the silicon be so eliminated. Otherwise under illumination the potential rise from one junction would be counteracted by a potential drop in the associated junction. It should be noted that the first region 11*a* and the last region 12*a* are single alloy regions. The wires or strips forming these regions extend beyond the edges of base 10 to form terminals 13 and 14.

The invention operates as follows. By reason of the continuity of junctions 23 through the total thickness of base 10, light impinging upon either surface 20 or surface 22 and containing photons having appropriate energy levels will release hole-electron pairs which will be separated by junctions 23 by reason of the inherent electrostatic charges existing across the junctions. Connection of electrodes 13 and 14 to an external circuit will produce a flow of electrical current. The photoelectric nature of P–N junctions is well known and thoroughly described in the literature. Where regions 11 and 11*a* are produced by alloying aluminum into a base 10 of N-type silicon, electrode 13 will be positive and electrode 14 connected to the ohmic contact 12*a* produced by alloying antimony-doped gold into base 10, will be negative. The potentials across intermediate P–N junctions will be found to add in series fashion so as to produce between electrodes 13 and 14 a potential equal to $n$ times the voltage per junction, where $n$ is the number of P–N junctions 23.

The regions 11 and 11*a* should have the same length throughout base 10 so that P–N junctions 23 have corresponding areas and, as a result, corresponding current generating capacities. The maximum current attainable from the unit is limited by the least effective P–N junction and, therefore, these junctions should be made as nearly equally effective as possible.

Thus, it can be seen that there has been provided a photoelectric converter that will provide a relatively high voltage by reason of its inherent construction and does not require external series connections between photoelectric converting junctions to attain a desired voltage level. Such a device may find application not only in the conversion of solar energy for practical applications but also in many photoelectric signalling and control applications.

While, for purposes of clarity, the foregoing description has referred to base 10 as N-type silicon and the alloying materials as aluminum and antimony-doped gold, this invention contemplates the use for base 10 of either P or N-type semiconductor materials, including germanium, silicon carbide and the various intermetallics such as gallium arsenide with appropriate alloying materials to produce P–N junctions.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A photoelectric converter including a quadrilateral base portion of N-type silicon, a plurality of aluminum alloy regions spaced from each other along said base portion and extending through and across said base portion, and at least one ohmic contact to and extending through said base portion.

2. A photoelectric converter in accordance with claim 1, in which said ohmic contact includes a region of silicon-gold-antimony alloy.

3. A photoelectric converter of the semiconductor type, comprising a segmental body member having a plurality of pairs of first and second semiconductor segments of opposite conductivity type forming a P–N junction between the segments of each pair, said pairs being disposed in series-aiding relationship in said member with adjacent couples of said segment pairs being connected together by respective third segments, each of said third segments making ohmic contact with the first segment of one of said pairs and being partially alloyed with the second segment of another of said pairs, the alloyed portions of such first and second segments of consecutive ones of said pairs providing an ohmic contact between such segments due to substantial cancellation of opposite conductivity characteristics in such portions, the second segment of a first of said pairs providing a first contact means for conductive connection to an external circuit, and an ohmic contact segment contiguous to the first segment of one of said pairs remote from said first pair for providing a second contact means for conductive connection to such external circuit.

4. A photoelectric converter in accordance with claim 3, wherein said first and second contact means are each integral with the respective segment to which they are connected.

5. A photoelectric converter of the semiconductor type, comprising a segmental body member having a plurality of series-connected groups of three segments each, each of said groups comprising a first segment of semiconductor material of one conductivity type lying between a second segment of semiconductor material of an opposite conductivity type and a third segment making ohmic contact with said first segment, said first and second segments forming a P–N junction therebetween, the third segment of a first of said groups providing a first contact means for conductive connection to an external circuit, the third segment of each of the remaining groups being partially alloyed with the second segment of a respective one of said groups, the alloyed portions of such second and third segments providing an ohmic contact between such segments due to substantial cancellation of opposite conductivity characteristics in such portions, and second contact means provided by the second segment of one of said groups remote from said first group for conductive connection to such external circuit.

6. A photoelectric converter in accordance with claim 5, wherein said first and second contact means are each integral with the respective segment to which they are connected.

7. The process for producing photoelectric converters which comprises the steps of applying to a semiconductor base a plurality of pairs of aluminum and gold-antimony wires, the wires in each pair being contiguous, and heating the base and said wires until such wires alloy through the thickness of said base.

8. The process for producing photoelectric converters which includes the steps of applying to a semiconductor base of N-silicon a single aluminum wire at one extremity, a single antimony-gold wire at the opposite extremity and a plurality of pairs of aluminum and gold-antimony wires therebetween, heating the base and wires to the alloying temperature and permitting the alloy to cool to the ambient temperature.

References Cited in the file of this patent

UNITED STATES PATENTS 2,588,254 Horovitz et al. ---------- Mar. 4, 1952